277-34 AJ 246 EX
5/15/87 03 RE 32,438

United States Patent [19]
Wood et al.

[11] E Patent Number: Re. 32,438
[45] Reissued Date of Patent: Jun. 16, 1987

[54] WELL PACKER VALVE ARRANGEMENT

[75] Inventors: Edward T. Wood, Kingwood; Robert E. Snyder, Houston, both of Tex.

[73] Assignee: Completion Tool Company, Houston, Tex.

[21] Appl. No.: 622,958

[22] Filed: Jun. 21, 1984

Related U.S. Patent Documents

Reissue of:
[64] Patent No.: 4,402,517
Issued: Sep. 6, 1983
Appl. No.: 408,123
Filed: Aug. 13, 1982

[51] Int. Cl.[4] ..... F16J 15/46; E21B 33/12
[52] U.S. Cl. ..... 277/34; 277/31; 166/122; 166/187
[58] Field of Search ..... 277/3, 30, 31, 34, 34.3, 277/34.6; 166/120, 122, 141, 151, 166, 187, 212, 244 R

[56] References Cited

U.S. PATENT DOCUMENTS

| | | | |
|---|---|---|---|
| 3,351,349 | 11/1967 | Chenoweth | 277/34 |
| 3,373,820 | 3/1968 | Robinson et al. | 166/187 |
| 3,427,651 | 2/1969 | Billstein et al. | 166/187 X |
| 3,437,142 | 4/1969 | Conover | 277/34 X |
| 3,503,445 | 3/1970 | Cochrum et al. | 166/151 X |
| 3,542,127 | 11/1970 | Malone | 277/34 X |
| 3,581,816 | 6/1971 | Malone | 166/187 |
| 3,776,308 | 12/1973 | Malone | 166/187 |
| 3,818,922 | 6/1974 | Malone | 166/187 X |
| 4,063,427 | 12/1977 | Hoffman | 166/187 X |
| 4,260,164 | 4/1981 | Baker et al. | 277/34 |

*Primary Examiner*—Robert S. Ward, Jr.

[57] ABSTRACT

A valve system for use in inflating packers mounted on mandrels. The valve system uses one or more valves to permit, through the use of seals, the flow of fluid from the interior of a tubular mandrel to the interior of the inflatable packer when pressure applied in the mandrel exceeds at least a minimum pressure. The differential pressure across reciprocating seals is minimized through exposure of one or both sides, directly or indirectly, to the external pressure of the mandrel and packer, the exposure including the use of a check valve to permit flow from the exterior of the mandrel.

7 Claims, 4 Drawing Figures

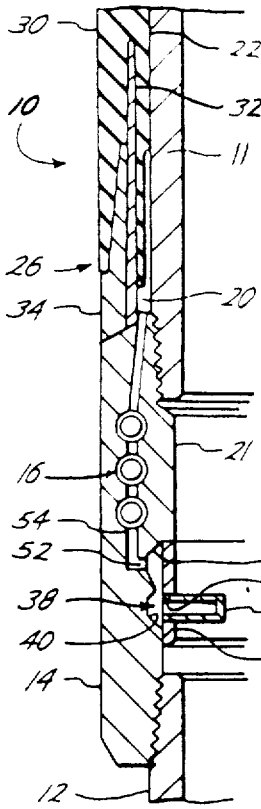
Fig. 2
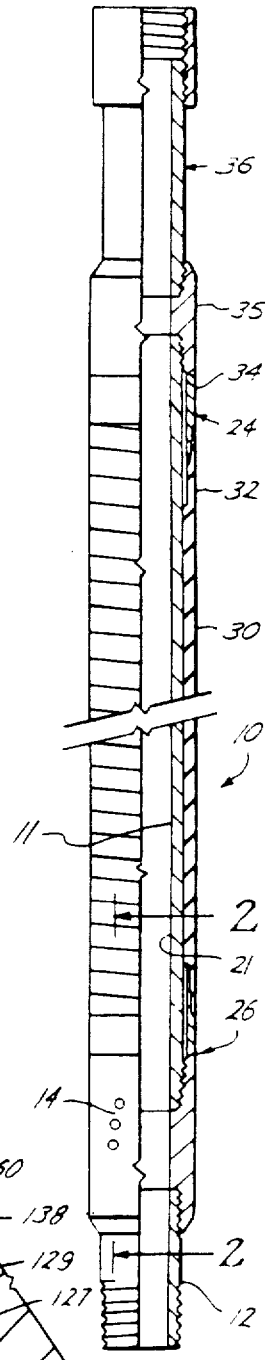
Fig. 1
Fig. 3
PRIOR ART
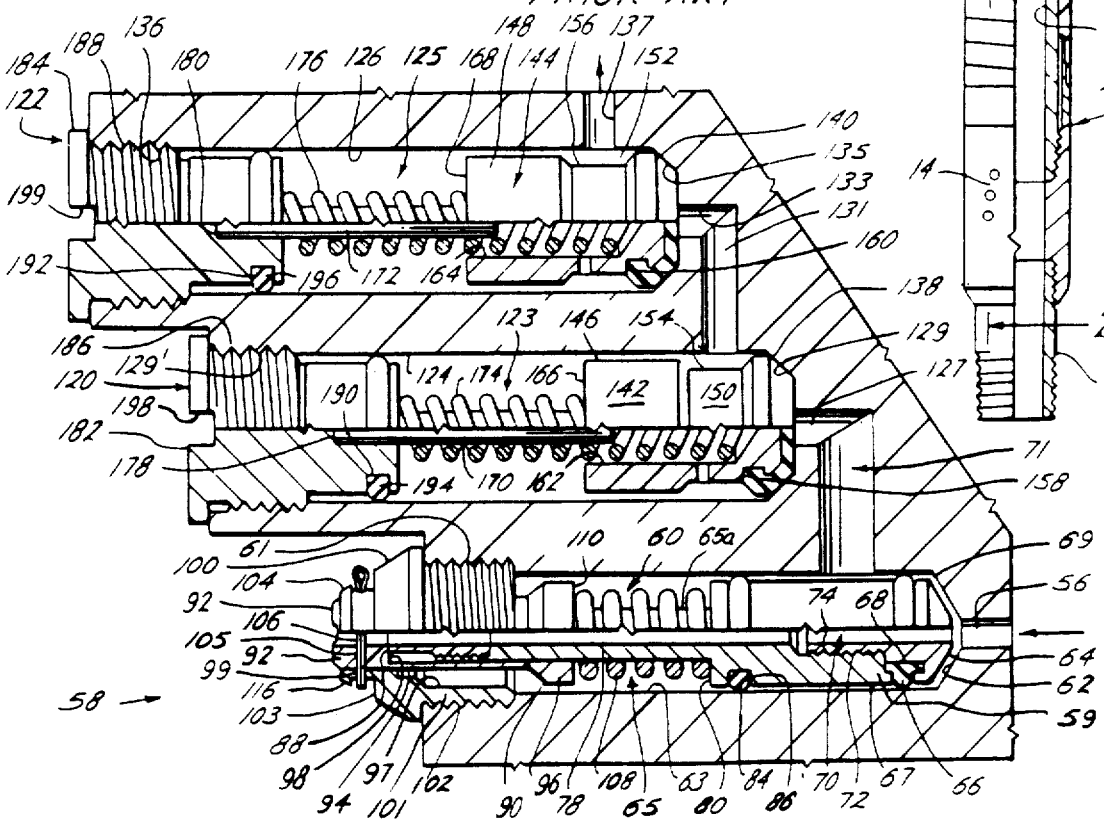

WELL PACKER VALVE ARRANGEMENT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to packer inflation systems and more particularly to the valves which control the inflation of packers.

2. Description of the Prior Art

The control of the inflation of well packers is important to obtain integrity between the packer and the well bore for purposes of working within the bore. It is known in the art to inflate packers by various mechanisms. See, for example, U.S. Pat. No. 3,503,445, issued Mar. 31, 1970, to K. L. Cochran et al., entitled "Well Control During Drilling Operations"; U.S. Pat. No. 3,351,349, issued Nov. 7, 1967, to D. V. Chenoweth, entitled "Hydraulically Expandable Well Packer"; U.S. Pat. No. 3,373,820, issued Mar. 19, 1968, to L. H. Robinson, Jr. et al., entitled "Apparatus for Drilling with a Gaseous Drilling Fluid".

In U.S. Pat. No. 3,437,142, issued Apr. 8, 1969, to George E. Conover, entitled "Inflatable Packers for External Use on Casing and Liners and Method of Use", there is disclosed an inflatable packer for external use on tubular members such as casings, liners, and the like. A valving arrangement is disclosed therein for containing fluid within the interior of the inflatable member after it has been inflated to prevent its return to the tubular member.

Arrangements of valving have been known in the prior art to prevent further communication between the interior of the tubular member and the interior of the inflatable element after the inflatable element has been inflated and set in a well bore. See, for example, U.S. Pat. No. 3,427,651, issued Feb. 11, 1969, to W. J. Bielstein et al., entitled "Well Control"; U.S. Pat. No. 3,542,127, issued Nov. 24, 1970, to Bill C. Malone, entitled "Reinforced Inflatable Packer with Expansible Back-up Skirts for End Portions"; U.S. Pat. No. 3,581,816, issued June 1, 1971, to Bill C. Malone, entitled "Permanent Set Inflatable Element"; U.S. Pat. No. 3,818,922, issued June 25, 1974, to Billy C. Malone, entitled "Safety Valve Arrangement for Controlling Communication Between the Interior and Exterior of a Tubular Member"; and U.S. Pat. No. 3,776,308, issued Dec. 4, 1973, to Bill C. Malone, entitled "Safety Valve Arrangement for Controlling Communication Between the Interior and Exterior of a Tubular Member".

Inflatable packers have also been used in other operations, such as sealing the annular space between a jacket and a piling. See for example U.S. Pat. No. 4,063,427, issued Dec. 20, 1977, to Erwin E. Hoffman, entitled "Seal Arrangement and Flow Control Means Therefor".

The seals that are used in valves, such as in Malone, are usually hardened rubber. Such rubber tends to extrude under extreme pressure differential across the rubber and cause friction between rubber and metal that adversely affects valve operation. None of the prior art, however, provides for mechanism for equalizing pressures across the seals of the valves used to inflate packers to prevent such extrusion.

SUMMARY OF THE INVENTION

The present invention utilizes a unique arrangement of sealing mechanisms in conjunction with a valve or valves to permit the inflation of an inflatable packer element while at the same time equalizing pressure around the rubber seals of the valve or valves to prevent distortion of the seals from undue high differential pressure, and the resulting friction.

The present invention, like the prior art, is constructed and arranged so that the valve or valves remain seated to prevent communication between the interior of a tubular member and the interior of an inflatable element carried on the exterior of the tubular member until at least a predetermined pressure has been reached. This reduces the possibility of premature inflation of the inflatable element by sudden pressure changes or pressure surges which may occur within the tubular member as the tubular member is being positioned within a well bore.

However, the valve arrangement of the inflation system of the present invention includes an appropriate check valve arrangement of a portion of the valve structure to compensate for bore pressure to prevent extrusion from undue high differential pressures across the seals of certain rubber seals which must move in the valving operation.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 1 is a cross-section of a packer showing the three-valve collar for inflation of the packing;

FIG. 2 is an enlarged cross-section of the valve arrangement of FIG. 1 taken along section line 2—2 of FIG. 1;

FIG. 3 is an enlarged cross-sectional view of the three valves of a three-valve arrangement within the three-valve collar of the prior art.

DETAILED DESCRIPTION OF THE PREFERRED EMBODIMENT

Figure 4:
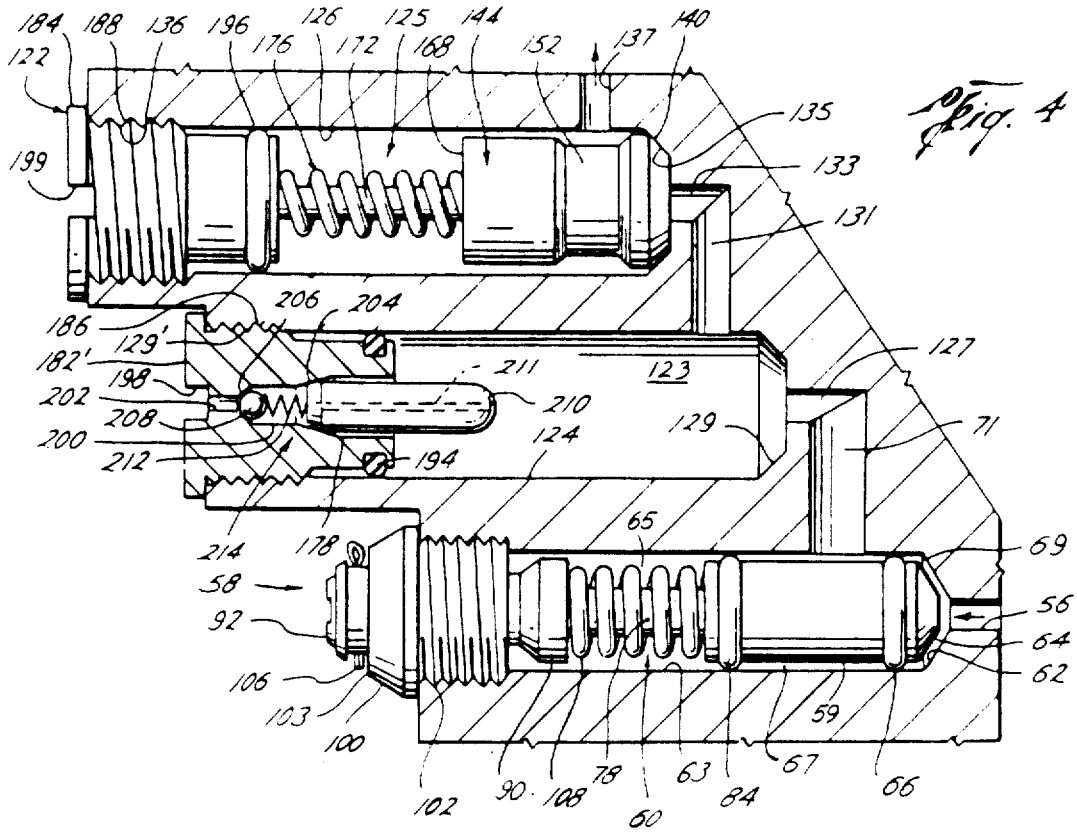
FIG. 4 is an enlarged cross-sectional view of three valves of a three-valve arrangement of the present invention within the three valve collar.

A tubular [member] *inflatable packer* 10 is shown in FIGS. 1 and 2. This type of [member] *packer* could be used for any of the embodiments of the present invention and is specifically illustrated for embodiments 1 and 2, [and may be] *as* a casing packer. [Member] *The tubular inflatable packer* 10 includes a short casing joint or casing sub 12 for connection to other tubular members and is secured by suitable means, such as threads as illustrated in FIG. 1, to a valve collar 14 secured to [the body] *a tubular pipe member or mandrel* 11 [of the tubular member 10]. It should be noted that *in one aspect of the present invention*, the valve collar 14 could also be and is preferably secured to [the] *a* sub 36 [of] *at the* other end of [body] *the tubular pipe member* 11 [shown in FIG. 1]. [Valve] *The valve* collar 14 includes *a* valve mechanism 16 *or system of valves and passageways* (*See* FIG. 2) for [communicating] *placing* fluid [from the interior 21 of tubular member 10 to the] *in a bore or interior 21 of the pipe member 11 in fluid communication with a* fluid channel *or chamber* 20 (*See* FIG. 2) [leading to the] *under an* inflatable[, or] packing[,] element [22] *30* carried externally on *the* tubular *pipe* member [10] *11*.

The inflatable *packing* element [22] *30* includes spaced apart *upper and lower* annular packer heads 24, 26. [Lower] *The lower packer* head 26 is secured to *the* valve collar 14[. Upper] *while the upper packer* head 24 is secured to *a* top *or upper* collar 35. [Inflatable] *The inflatable packing* element [22] *30* extends between *the packer* heads 24, 26 and is also secured to [mandrel 28] *the pipe member 11* which extends along the inside surface of *the packing* element [22] *30* between *the* valve collar 14 [to] *and the* upper collar 35 [where mandral 28 is connected by threading or other means]. The inflatable *packing* element *30* may be of any suitable length and is [provided with] an elastomer cover [30] and [two sets of] *with upper and lower sets of* steel anti-extrusion ribs 32. [Ribs] *The ribs* 32 are connected to the *elastomer* cover [30,] such as, for example, [vulcanized into the rubber, and extend therein.] *by vulcanizing the elastomer cover to the ribs 32 so that the ribs 32 extend into the ends of the elastomer cover.* Each set of ribs 32 is connected to a steel back-up sleeve 34, and one set *of ribs* is connected to *the* valve collar 14 while the other set *of ribs* is connected to *the upper valve* collar 35. [Sleeve] *The back-up sleeve* 34 is also connected to [packing element 22,] *the elastomer cover,* such as vulcanized with the rubber, and to *the* valve collar 14. [A] *The tubular* sub 36 is connected to the [other portion of] *upper* collar 35 for use with other tubular members *in a string of pipe or casing* (*not shown*).

[A] *As shown in FIG. 2, a* first set of *annular* grooves 38 is formed [on] *in the* valve collar 14. The set of grooves 38 includes internal, circumferential *annular* grooves 40, 42 [formed in valve collar 14. Grooves 40, 42 are partially] *spaced longitudinally apart from one another and* covered by *a* juxtaposed screen sleeve 44. [Sleeve] *The screen sleeve* 44 includes a hole 46 [covered by] *which receives* a knock-off rod *or plug* 50, usually *constructed* of plastic, to isolate the valve system from *fluid under* pressure in the [interior] *bore* 21 of the [member 10] *pipe member 11* during running *of the inflatable packer 10 into a well bore containing fluid.* .

[Groove 42 terminates in] *A* port 52 [extending] *extends* partially through the wall of the valve collar 14 and [connecting to] *connects a* passageway 54[. Passageway] *to the groove 42. The passageway* 54 extends along the center of *the* valve collar 14 [to] *between a port 56 to a valve in the valve mechanism 16 and* the port [56 of the valve system] *52* (*See FIG. 3*).

*—PRIOR ART—*

[Shear] *In a prior art valve mechanism as shown in FIG. 3, a shear* valve 58 [(FIG. 3, FIG. 4)] is in fluid communication with *the* port 56 [via insertion of], *the shear* valve 58 *being* in *a valve* pocket 60[. pocket 60] *formed by a cylindrical bore 63 in the wall of the valve collar. The shear valve 58 includes a movable valve element or valve body 59 slidably disposed in the valve pocket 60. The valve pocket 60 is* formed in *the* valve collar 14 by drilling [of] *or* other means. [Valve] *One end of the valve* pocket 60 is in fluid communication with *the* port 56[. Pocket 60 forms] *and this end of the valve pocket 60 has an* angled valve seat 62 [at the end of pocket 60 in direct fluid communication with] *disposed around the* port 56. The [other] *open* end of *the valve* pocket 60 [is threaded with] *has* threads 61. [Pocket 60 is cylindrical in shape having upper surface 63 of one] *The movable valve element 59 has a cylindrical first surface 65a with a first* diameter [in] *forming an* upper *or first* chamber 65 *with the surface wall of the valve pocket 60* and [coaxial lower] *has a cylindrical second* surface 67 [of] *with* a second, [smaller] diameter [in] *forming a* lower *or second* chamber 69[. Upper] *with the surface wall of the valve pocket 60. The lower or second* chamber [63] *69* has an opening to *a* lateral passageway 71 [at one end] which extends further into *the* valve collar 14.

[Valve 58 includes a cylindrical shaped] *The movable valve element or valve* body 59 [with] *defining the cylindrical second surface 67 terminates at* an end portion 64 shaped to [fit in] *compliment the valve* seat 62. A T-seal, or other suitable seal[,] 66 is [included along] *disposed on* the [circumference 73 of] *second surface 67 the valve* body 59 in *a* groove 68 [of] *near the* end portion 64. [Seal] *The seal* 66 is adapted to engage the *surface* wall [67 of] *of the valve pocket in* the lower *or first* chamber 69[substantially parallel to the circumference 73]. [A threaded] *The movable valve element or valve body 59 has a* bore 70 [having] *with* internal threads 74 [is formed longitudinally along the lower portion of body 59. End 64 is connected by] *to connect to the end portion 64 by virtue of* external threads 72, or other suitable means[, to internal threads 74 of the longitudinal bore 70]. The *movable valve element or* valve body 59, as illustrated, is reduced in size at the end opposite to *the* end portion 64 to form a valve stem 78 with a first shoulder 80 [formed at the juncture of valve stem 78 and] *on* the valve body 59. A suitable seal 84, such as an O-ring, is arranged in *a* groove 86 on [the upper] *a* portion of *the* valve body 59 between the end portion 64 and *the first* shoulder 80. [Seal] *The seal* 84 is adapted to seal against the [upper] surface [63 of upper chamber 65 of pocket 60] *wall* and *the* groove 86[.] *and separate the upper or first chamber 65 from the lower or second chamber 69.*

[Valve] *The valve* stem 78 terminates at [its top] *an end* 88 which [is adjacent] *abuts an end surface 98 in a sleeve 94 in a* collet 90. [Collet] *The collet* 90 has *a* thick top section 92 and an elongated *tubular* sleeve 94 terminating in bell-shaped, lower section 96. [Sections 92 and 94 form an inner end 98 which abuts stem top 88. Collet] *The collet* 90, which abuts *the* valve stem 78 at [its inner end] *the surface* 98[,] is retained in *the valve* pocket 60 by *an* annular retainer housing 100 which annularly surrounds *the* collet 90[. Annular] *and a shear pin 106 which interconnects the retainer housing 100 to the collet 90. The annular* retainer housing 100 has a base 101 with threads 102 [formed on the outer circumference thereof. Threads 102] *which* mate with *the* threads 61 [which secured] *of the valve pocket 60 and secured the retainer* housing 100 to *the valve* pocket 60. [Housing] *The retainer housing* 100 further has a bore 97 formed through *its* base 101 to receive *the* collet 90 and an opening 116 [at its top] through which *the top* section 92 *of the collet 90* extends.

[A] *The* shear pin 106 extends through a bore 99 in *a* notch 103 in [the] *an* end 104 of the retainer housing 100 and a bore 105 in the end 92 of *the* collet 90 as shown in FIGS. 3 and 4 to retain *the* valve [58] *body 59* in the seated position with *its* end portion 64 adjacent *the valve* seat 62 [to] *so that the seal 66 will* block off [fluid flow through] *fluid and pressure from the* port 56 [from] *and* the [interior 18] *bore 21* of the tubular *pipe* member [10] *from access* to the *passageway 71 and*

*hence prevent fluid or pressure from reaching the* fluid channel 20 leading to the interior of the inflatable *packing* element 30 [via passageway 71]30.

A spring 108 [surrounds] *is disposed on the* valve stem 78 with one end of the spring abutting the shoulder 80 and the other end *of the spring* abutting [the] *an* end 110 of the collet 90, such spring 108 being forced to a collapsed position as illustrated when the valve *body 59* is in the position as shown in [FIGS. 3 and 4] *FIG. 3* of the drawings.

The strength of shear pin 106 will determine the minimum amount of fluid [differential] pressure necessary in *the* port 56 to unseat the valve *body 59 and to open the shear valve* 58 and *to* permit fluid flow through the port 56 from the [interior of tubular] *bore 21 of pipe* member [10] *11* to the interior of [packer] *packing* element 30.

[Seals] *The seals* 66, 84 are positioned *on the valve body 59* such that when the valve [58] *body 59* is in the seated position as shown in [FIGS. 3 and 4] *FIG. 3*, the seals 66, 84 prevent any fluid flow [from] *or pressure in the* port 56 [to] *from reaching the* pasageway 71. [They] *The seals 66, 84* also prevent the flow of any fluids *or pressure* from the exterior of *the valve* collar 14 [in contact with] *from reaching the passageway 71. Fluid in* the bore hole [which leak through] *by the* threads 102 and past *the* collet 90 in *the* housing 100 *and* into *the* upper *or first* chamber 65[to flow into passageway 71]. In addition, when the valve [58] *body 59* is in the seated position, *the* shoulder 80 *on the valve body 59* is separated from *a* bottom 110 *of the collet 90* by a sufficient distance [such] *so* that when the valve [58] *body 59* is no longer in the seated position [but] *then the* shoulder 80 is as close to *the* shoulder 110 as the [springs] *spring 108* will allow[,] *and the* seal 66 is positioned above *the* passageway 71[.] *so that fluid and pressure is admitted to the passageway 71 from the port 56.*

In FIG. 3, *the check* valves 120 and 122 are substantially identical in construction. [Valves] *The check valves* 120, 122 are located in *valve* pockets 123, 125 respectively. Each *valve* pocket 123, 125 is *formed by a cylindrical bore and is* substantially cylindrical in shape with walls 124, 126 respectively formed by drilling or other suitable means [of opening with] *and each valve pocket 123, 125 opens at* one end at the exterior outer surface of *the* valve collar 14. The other end of *the valve* pocket 123 terminates at *a* port 127 *which places the valve pocket 123* in fluid communication with the [pocket 123 and] passageway 71. [Pocket] *The valve pocket* 123 [forms] *is formed with an* angled valve [seats] *seat* 129 at the end of *the valve* pocket 123 in direct fluid communications with *the* port 127. The other end of *the valve* pocket 123 is threaded with threads 129'. [Passageway] *A passageway* 131 also *is* formed in *the* valve collar 14 *and* extends laterally further into valve collar 14 from the wall of *the valve* pocket 123 and is in fluid communication with *the valve* pocket 123. The other end of *the valve* pocket 125 terminates at *a* port 133 *which is* in fluid communication with the *valve* pocket 125 and *the* passageway 131. [Pocket] *The valve pocket* 125 [forms] *is formed with an* angled valve [seats] *seat* 135 at the end of *the valve* pocket 125 *and is* in direct fluid [communications] *communication* with *the* port 133. The other end of *the valve* pocket 125 is threaded with threads 136. [Passageway] *A passageway* 137 *is* also formed in *the* valve collar 14 *and* extends laterally further into *the* valve collar 14 from the wall *126* of *the valve* pocket 125 and is in fluid communication with *the valve* pocket 125 and *the* fluid channel 20. (*See FIG. 2*)

Each of the [poppet] *check* valves 120, 122 includes an end portion 138, 140 respectively of elastomer *material* for engaging on seats 129, 135 respectively formed between ports 127, 133 and the walls of *the valve* pockets 123, 125 respectively. Each *check* valve 120, 122 has a *movable* valve body *or element* 142, 144 respectively. The general shape of each valve body 142, 144 is cylindrical in configuration. The *valve* body 142, 144 of each valve *pocket* 123, 125 has an upper portion 146, 148 respectively and a lower, smaller diameter portion 150, 152 respectively with a swage *or annular recess* 154, 156 respectively separting the upper and lower portions of *a* valve body. The tops of elastomer [ends] *end portions* 138, 140 are fitted into grooves 158, 160 respectively formed circumferentially in lower [ends] *portions* 150, 152 respectively to hold the elastomer [ends] *end portions* on *the* lower portions 150, 152 respectively. A bore 162, 164 is formed [through the] *in an* end 166, 168 respectively of [valves] *the valve bodies* 142, 144 [facing] *and faces* away from *the* seats 129, 135 and extends substantially through the valve bodies 142, 144 respectively. A valve stem 170, 172 is inserted in [the] *a counter* bore 162, 164 respectively with a spring 174, 176 in its [collapsed] *expanded* position circumferentially surrounding *the valve* stems 170, 172 respectively.

Each valve stem 170, 172 is received in a bore 178, 180 respectively in *a* retainer housing 182, 184 of *the check* valves 120, 122 respectively. Each retaining housing 182, 184 is externally threaded with threads 186, 188 adapted to mate with threads 129', 136 respectively of *the valve* pockets 123, 125 respectively. Each *retaining* housing 182, 184 also includes [a slot] *an annular groove* 190, 192 sized to receive a sealing means 194, 196, such as an O-ring, to sealingly engage the walls 124, 126 of *the valve* pockets 123, 125 and [slots] *the grooves* 190, 192 respectively. Each *retaining* housing 182, 184 also includes a [groove] *slot* 198, 199 respectively cut out in [the head] *each retaining housing* for external access *or removal of valve stems and valve bodies* from *the* valve collar 14.

In operation, when the rod *or knock-off plug* 50 is still in place, (*See FIG. 2*) any communication of fluid *or pressure* from the [interior] *bore 21* of tubular *pipe* member [10] *11* to the fluid port 56 [of any of the prior art or the embodiments] is prevented. This prevents pressure variations or pressure surges from acting through port 56 and unseating the valve *body 59 of the shear valve 58* which might prematurely inflate the *packing* element 30.

When it is desired to actuate the device [of any of the embodiments] and communicate fluid to the channel 20 of *the* packing element [22] *30* carried on the exterior of the casing or tubular member [10] *11*, any suitable means (not shown) may be dropped through member [10] *11* so as to break or shear the rod 50 to permit fluid communication with the [groove set] *set of grooves* 38.

Thereafter, fluid may be communicated through the *set of* grooves [40, 42,] *38*, the port 52, and the passage 54 to the inlet port 56 between the inner and outer walls of the valve collar 14. The fluid pressure of this fluid acts upon the end portion 64 of the valve [58] *body 59*, and the pressure within the tubular member [10] *11* may be increased so as to *produce a pressure differential between the fluid in the bore 21 of the tubular member 11 and the fluid exterior to the valve collar 14 and thereby* shear the pin 106 whereupon the valve body 59 moves to a position where *the* seal 66 no longer obstructs the flow of fluid to *the* passageway 71 from *the* port 56 thereby permitting fluid flow from *the* port 56 through passageway 71 to *the* port 127. This longitudinal movement of *the valve* body 59 causes the valve stem 78 as well as the collet 90 surrounding the end thereof to move outwardly through the opening 116 of the retainer housing 100, compressing spring 108 between the shoulder 80 and the end 110 of the collet 90. The flow of fluid to *the* port 127 builds *up* pressure on *the* end 138 *of the valve body 142*. When the pressure on *the* end *portion* 138 *of the valve body 142* overcomes the break out friction of *the* end *portion* 138 and the force *required* to compress *the* spring 174, *the* valve body 142 [rises] *moves* so that *the* end *portion* 138 no longer obstructs the flow of fluid from *the* port 127 through *the* passageway 131 to *the* port 133. The flow of fluid to *the* port 133, *in turn*, builds *up* pressure on *the* end *portion* 140[, when] *of the valve body 144. When* the pressure on *the* end *portion* 140 overcomes the break out friction of *the* end *portion* 140 and the force *required* to compress *the* spring 176, *the* valve body 144 [rises] *moves* so that *the* end *portion* 140 no longer obstructs the flow of fluid from *the* port 133 to *the* passageway 137 to *the* channel 20 and [packer] *fluid supplied to the packing element* 30 inflates *the packing element 30.*

Those skilled in the art would believe that *the* shear pin 106 *in the shear valve 58* would shear at a given pressure at *the* port 56 *relative to the pressure exterior of the valve collar 14* depending only on the strength of the shear pin 106. However, this is not the case. At the time the tubular *pipe* member [10] *11* is lowered into the well, the pressure in *the* passageway 71 is at atmospheric pressure. The same is true of the pressures in *the* upper [pocket] *or first* chamber 65 and the pressure at *the* port 56. However, as the tubular *pipe* member [10] *11* is lowered into the well, the pressure in *the* upper [pocket] *or first* chamber 65 changes to [that of the exterior of] *the pressure in* the well because there is no seal [through] *to prevent well fluid from leaking by the* retainer housing 100 as discussed above. In addition, as pressure within the tubular *pipe* member [10] *11* increases, the pressure at *the* valve port 56 increases. However, there is no path for the rising *or increasing fluid* pressure to enter passageway 71 and *to* raise [it] *the pressure in passageway 71* above atmospheric *pressure*. Accordingly, while the valve *body 59* is seated, *the* seals 66, 84 will tend to extrude toward *the* passageway 71 because of the high differential pressure between the upper [pocket] *or first* chamber 65 and *the* passageway 71, and *the high differential pressure* between *the* lower [pocket] *or second* chamber 69 and *the* passageway 71. In such circumstance, the [seal rings] *seals* 66, 84 [are] *become* locked and the pressure *required in the port 56* to overcome *the* breakout friction to move *the valve* body 59 [then goes] *is* much higher. This is because the O-rings usually used in the prior art [of] *embodiment shown in* FIG. 3 are designed to only hold 4,000 to 5,000 psi of differential pressure. In deep wells, this breakout friction would be very high and normally a discontinuity in breakout [pressure] *friction* is exhibited at wells having a depth which exhibit downhole pressures of 5,000 to 6,000 psi. In addition, [as discussed above, the diameter] *the annulus* of *the* upper [pocket] chamber 65 is larger than *the annulus of the* lower [pocket] chamber 69. In the prior art, in order to overcome this difference in [diameter] *the annulus*, a sleeve is installed in *the* upper [pocket] chamber 65. Nevertheless the [sleeves] *sleeve* may not be perfect and the remaining space in the upper [pocket] chamber 65 is elliptical in shape having a major and a minor diameter both larger than the diameter of *the* lower [pocket] chamber 69. Therefore, the force of the pressure on *the* seal 84 in *the* upper [pocket] chamber 65 is greater than the force by an identical pressure acting on *the* seal 66 from *the* valve port 56.

Accordingly, as the well [is deeper and] *depth increases*, the pressure in upper [pocket] chamber 65 increases[,] *and* the amount of pressure required at *the* port 56 *to open the valve 58* may be far greater than anticipated [by knowledge of] *with respect to* the shear strength *required* of shear pin 106 in order to cause shear pin 106 to shear *at a selected pressure.*

*EMBODIMENT OF THE INVENTION*

To avoid the problems of the prior art [of] *embodiment illustrated in* FIG. 3, the *present invention utilizes a* valve system [is modified] as shown in FIG. 4. [The modifications include removal of shear valve 58 from pocket 60. In addition,] *In FIG. 4 as compared to FIG. 3, the check* valve 120 is [also] removed[. After shear] *from the valve pocket 123. When the shear* valve 58 is removed from *the valve* pocket 60[. All] *all* grease is removed from *the* O-ring *seal* 84 and *the* T-seal ring 66. The shear valve *58* is then lubricated with Baker Tubing Seal Grease Number 499-26 which is not reactant with the O-ring seal 84 or the T-seal 66 at elevated temperatures[. The shear valve 58 is] *and* then replaced in *the valve* pocket 60 in the manner known in the prior art. [Pocket] *The valve pocket* 123 is then filled, preferably with water or other suitable substance, although it could be left unfilled. *The shear valve 58 thus has a reciprocating valve element or valve body member 59 with seals 66 and 84 which prevent flow of fluid to the passage 71 (part of the passageway means) and stop means in the form of the shear pin 106 which prevent reciprocation of the reciprocating valve member prior to the application of a predetermined pressure difference.*

[A modified] *As shown in FIG. 4, a* retainer housing 182' is [then] installed in *the valve* pocket 123. The [modified] retainer housing 182' includes a bore 200 of smaller diameter than *the* bore 178 [drilled coaxially through bore 178. Housing] *The housing* 182' [is] further [modified to include] *includes a* counter bore 202 coaxial with and of smaller diameter than *the* bore 200 *and is* formed by drilling or other means through the approximate center of *a transverse* groove 198. The disparity of diameters causes *an* downwardly, outwardly, sloping shoulder 204 to be formed between *the* bore 178 and *the* bore 200 and *an* downwardly, outwardly sloping shoulder 206 to be formed between *the* bore 200 and *the* bore 202. A ball 208 is located within *the retainer* housing 182' in close proximity to the opening of *the* bore 202 facing *the* bore 200. [Ball] *The ball* 208 is held against *the* shoulder 206 by *a* compressed spring 212. [Spring] *The spring* 212 is compressed by *a* rod 210 which contains an internal longitudinal fluid passageway 211 extending therethrough and opening at each end. [Rod] *The rod* 210 is inserted into *the* bore 178 by hammering or other means to force the rod 210 into the entry of *the* bore 200 where it is held by friction with *the* spring 212 and *the* ball 208 extending into *the* cocurrent bore 200 such that *the* ball 208 abuts the shoulder 206 and the rod 210 extends substantially into the shoulder 204 forming a check valve assembly 214.

*The flow passage or port 56 is independent of the seals 84 and 66 for permitting flow of fluid from the interior or bore of the pipe member 11 to one side of the seal 66 and the retainer housing 100 is independent of the seals 84 and 66 for permitting the flow of fluid from the exterior of the valve collar 14 and the pipe member 11 to an oppositely facing surface of the seal 84.*

*The structure in the valve pocket 123 comprises means independent of the seals 84 and 66 for permitting the flow of fluid via passage 71 at the pressure exterior to the pipe member 11 and the valve collar 14 to the other side of each of the seals to equalize the pressure across the seals 66 and 84.*

In operation, *when the valve system of FIG. 4, is installed in* the [member 10 of the first embodiment FIG. 4, when] *valve collar 14 and* lowered into the bore hole, [will cause] the pressure in *the* passageway 71 [to] *will* be approximately the same as the pressure in upper [pocket] chamber 65 of [bore] *the valve pocket* 60. This is effected by the check valve assembly 214 *in the valve pocket 123*. As pressure from the bore hole acts on *the* tubular *pipe* member [10] *11*, and particularly on [modified] *the retainer* housing 182', fluid will flow from *the* counter bore 202 through *the* bore 200 to *the* bore 178, around *the* ball 208, through *the* passageway 211 in *the* hollow rod 210 and thence to *the valve* pocket 123, *the* port 127 and *the* passageway 71. This will permit the fluid in *the valve* pocket 123 to be maintained at the pressure approximately that surrounding the tubular member [10] *11* which is substantially the pressure in the upper [pocket] chamber 65. Accordingly, the differential pressure between *the* upper [pocket] chamber 65 *in the valve pocket 60* and *the pressure in the* passageway 71 across *the* seal 84 will be very small. Further, the pressure at *the* port 56 will also initially be approximately that of the *well* bore so that the differential pressure across *the* seal 66 will be very small. In addition, as the pressure in port 56 [increases, and] *is increased to shear* pin 106 [shears, causing] *and cause the valve* body 59 to move [such that], *the* seal 66 moves to a position longitudinally above passageway 71[,] *and* the pressure in *the valve* pocket 123 will increase causing *the* ball 208 to seat on the shoulder 206 thereby stopping further fluid communication between *the* bore 200 and *the* bore 202. Therefore, the pressure in *the* passageway 71 [will] *can* continue to rise *or increase* causing *the check* valve 122 to unseat and permitting fluid flow to *the* passageway 137.

The [modified] port plug 182' is usually covered with Shell Darina Grease Number 2 or other suitable lubricant to prevent plugging of the check valve 214.

In addition, because multiple packers are usually run along a tubular string comprised of tubular *pipe* members [10] *11* and other tubular members, the seal diameters should be measured and an indication of such be made, such as on the valve collar 14. In this manner the packer with the smallest upper seal 84 area will be run closest to the bottom of the hole to minimize distortion caused by different areas between *the* seals 84 and 66 since the devices of the prior art always have a larger area for *the* seal 84 than for *the* seal 66.

Although the system described in detail above is most satisfactory and preferred, many variations in structure and method are possible.

Because many varying and different embodiments may be made within the scope of the inventive concept herein taught and because modifications may be made in accordance with the descriptive requirements of the law, it should be understood that the details herein are to be interpreted as illustrative and not in a limiting sense.

What is claimed as invention is:

1. A tubular system for use in packing off a well bore, comprising:

a [hollow] tubular mandrel;

[a packer] *an inflatable packing element* attached to said mandrel at one end of said mandrel;

a valve collar mounted on the other end of said mandrel, the other end of said [packer] *packing element* being attached to said *valve* collar [and], *said valve collar* having a passageway *means* therethrough, [and] *said passageway means in* said *valve* collar being in fluid communication with *the interior of* said [packer] *packing element* and the interior and exterior of said mandrel [by said passageway];

*at least two valve pocket means in said passageway means in said valve collar;*

[said passageway having enlarged portions in said collar;

a valve system mounted in said enlarged portions, said valve system including three valves;]

[the first of said valves being mounted in the first of said portions and having] *first valve means in a first valve pocket means and including* a reciprocating *valve* member and [a] stop means for preventing reciprocation of said reciprocating *valve* member *from a first position to a second position* prior to the application of at least a predetermined difference in pressure between one [side] *end* of said reciprocating *valve* member and the other [side,] *end of said reciprocating valve member,* said reciprocating *valve* member being located *in said first position* at one *open* end of a first part of said passageway *means* when said stop means prevents reciprocation and having at least two *spaced apart* seals [thereon] *which are disposed so that the one open end is between said seals* for preventing the flow of fluid from either end of said reciprocating *valve* member around *the seals on* the *reciprocating valve* member to said [first] *one open end of the first part of said* passageway [part] *means;* said first valve *pocket means* being in fluid communication [with a second part of said passageway in fluid communication] with [said] *the* interior of said mandrel [on] *and* one side [of] *of one seal on* said reciprocating *valve* member;

said first valve *pocket means* being in fluid communication with [said] *the* exterior of said mandrel [on the other] *and one* side of *the other seal on* said reciprocating *valve* member; and

[the second of said valves having check means] *second valve means in a second valve pocket means* for permitting the flow of fluid *in one direction* from [said] *the* exterior of said mandrel to said *one open end of the* first part of said passageway [when the pressure exterior of said mandrel exceeds the pressure in said second portion] *means between the seals;* said second [portion includes] *valve pocket means including* a first bore [opening] *which opens* to [said] *the* exterior of said mandrel and [said second] *check* valve [is] *means* located in said first bore;

said second valve [includes] *pocket means having* a [head adapted to connect] *retainer housing connected* to said first bore, a seal mounted on said [head] *retainer housing* and sealingly engaging the [walls] *wall* of said first bore and said [head] *retainer housing,*

[and] said check *valve* means [is] *being* mounted in said [head] *retainer housing;* said check *valve* means [includes] *including:* a second bore through said [head and] *retainer housing* substantially coaxial with said first bore;

a third bore through a portion of said [head] *retainer housing* substantially coaxial with said first and second bores, said third bore being of a greater diameter than said second bore and forming a shoulder therewith;

a ball adapted to seal against said shoulder; and mounting means for reciprocably mounting said ball in said third bore.

2. The system of claim 1 wherein said mounting means includes:

a rod, said rod being wedged into an end of said third bore;

a spring, said spring being mounted in said third bore and abutting said ball and one end of said rod.

3. The system of claim 2 wherein said rod has a hollow longitudinal fluid passage therethrough.

*4. A tubular system for use in packing off a well bore, comprising:*

*a tubular mandrel;*

*an inflatable packing element attached to said mandrel at one end of said mandrel;*

*a valve collar mounted on the other end of said mandrel, the other end of said packing element being attached to said valve collar, said valve collar having a passageway means coupling the interior of said packing element and the exterior of said mandrel in fluid communication with the interior and exterior of said mandrel;*

*at least two valve pocket means in said passageway means in said valve collar;*

*first valve means in a first valve pocket means and including a reciprocating valve member and stop means for preventing reciprocation of said reciprocating valve member from a first position to a second position prior to the application of at least a predetermined difference in pressure between one end of said reciprocating valve member and the other end of said reciprocating valve member, said reciprocating member being located in said first position at one open end of a first part of said passageway means when said stop means prevents reciprocation and having at least two spaced apart seals which are disposed so that the one open end is between said seals for preventing the flow of fluid from either end of said reciprocating valve member around the seals on the reciprocating valve member to said one open end of said passageway means;*

*said first valve pocket means being in fluid communication with a second part of said passageway means where said second part of said passageway means is in fluid communication with the interior of said mandrel and one side of one seal on said reciprocating valve member;*

*said first valve pocket means being in fluid communication with the exterior of said mandrel on one side of the other seal on said reciprocating valve member; and*

*second valve means in a second valve pocket means for permitting the flow of fluid in one direction from the exterior of said mandrel to said one open end of the first part of said passageway means between said seals.*

*5. The system of claim 4, wherein said second valve means includes:*

*a retainer housing for enclosing said second valve pocket means, said retainer housing having an opening therethrough;*

*a seal mounted on said retainer housing and sealingly engaging the wall of said second valve pocket means and said retainer housing; and*

*check valve means in the opening of said retainer housing.*

*6. The system of claims 4 or 5 wherein the said first part of said passageway means is filled with a liquid.*

*7. The system of claim 4 wherein;*

*there are at least three valve pocket means,*

*third valve means in a third valve pocket means,*

*said third valve means being in fluid communication by said passageway means (a) with said exterior of said mandrel (b) with said second valve pocket means and (c) with the interior of said packing element;*

*first seal means on said second valve means for preventing fluid communication between second valve pocket means and said exterior of said mandrel, and*

*said third valve means in said third valve pocket means having*

*second seal means for preventing fluid communication between said second pocket means and said interior of said packing element when the pressure in said interior of seal packing element is greater than the pressure in said second valve pocket means.*

* * * * *